United States Patent [19]
Wolf et al.

[11] 4,361,349
[45] Nov. 30, 1982

[54] RING-PACKED PIPE SPIGOT-AND-SOCKET CONNECTION

[75] Inventors: Franz J. Wolf; Hansjörg Lauer, both of Bad Soden-Salmünster, Fed. Rep. of Germany

[73] Assignee: WOCO Franz-Josef Wolf & Co., Bad Soden-Salmüster, Fed. Rep. of Germany

[21] Appl. No.: 209,702

[22] Filed: Nov. 24, 1980

[30] Foreign Application Priority Data

Dec. 4, 1979 [DE] Fed. Rep. of Germany ....... 2948736

[51] Int. Cl.³ ............................................. F16L 17/02
[52] U.S. Cl. .................................... 285/110; 285/345; 285/423
[58] Field of Search ............... 285/110, 111, 345, 379, 285/423; 277/207 A

[56] References Cited

U.S. PATENT DOCUMENTS

| 1,924,020 | 8/1933 | Bihet | 277/207 A |
|---|---|---|---|
| 4,003,591 | 1/1977 | Schuldink | 285/110 |
| 4,188,040 | 2/1980 | Wolf et al. | 277/207 A |
| 4,223,896 | 9/1980 | Strom | 277/207 A |
| 4,275,909 | 6/1981 | Yoshizawa | 285/345 |

FOREIGN PATENT DOCUMENTS

| 2614575 | 10/1978 | Fed. Rep. of Germany . | |
|---|---|---|---|
| 1435463 | 3/1966 | France | 285/110 |
| 1223575 | 2/1971 | United Kingdom | 285/111 |

Primary Examiner—Dave W. Arola
Attorney, Agent, or Firm—Webb, Burden, Robinson & Webb

[57] ABSTRACT

A ring-packed pipe spigot-and-socket connection in which an elastic rubber packing ring having an essentially V-shaped cross section is disposed in an annular groove provided in the inside wall of a socket in such a way that prior to the insertion of the spigot end, one of the two legs of the V-shaped packing ring lies substantially axially aligned and turned toward the outlet of the socket, while the other leg extends substantially radially into the interior of the socket. After insertion of the spigot end, the two legs of the V-shaped packing ring provide a seal at the external wall of the spigot end. In the process, the segment of the packing ring facing the two sealing legs, i.e. the "foot segment", seals against the bottom of the annular groove. The annular groove has the shape of a substantially shallow V-shaped chamber and is of such a width that it can accommodate the spread-out packing ring completely when the spigot end has been inserted in the socket. On its two axially opposite ends, the annular groove is bound by radially extending circular ring surfaces, whose radially innermost edge is defined by the intersection of the surface with the cylindrical inside wall of the socket. The foot segment of the packing ring is of toroidal design in the manner of the ball of a ball-and-socket joint and rounded off relatively flatly or shallowly. It lies in a recess whose profile is complementary to the profile of the foot segment and which has been provided axially approximately in the center of the circular groove having been designed in a shallow V-shape. This recess acts as an annular socket like that in a ball-and-socket joint for the foot segment of the packing ring. It accommodates and blocks the foot segment of the packing ring against axial displacement, but permits flexure of the ring in the recess of the groove. The recess is preferably slightly undercut in the direction toward the base of the socket.

28 Claims, 1 Drawing Figure

RING-PACKED PIPE SPIGOT-AND-SOCKET CONNECTION

BACKGROUND OF THE INVENTION

1. Field of the Invention

This invention relates to a ring-packed pipe spigot-and-socket connection in which an elastic packing ring, the cross section of which essentially has a V-shape, is located in an annular groove provided in the inside wall of a socket.

2. Brief Description of the Prior Art

A ring-packed pipe spigot-and-socket connection of this type is known from West German Patent Document No. 26 14 575 C3. In axial profile, the annular groove provided in the inside wall of the socket essentially has the shape of an irregular trapezoid with a steeper holding slope located at the rear in the direction of insertion of the front end of the spigot into the socket and with a flatter insertion slope located at the front in the direction of insertion of the spigot end into the socket. The insertion slope forms an angle of less than or equal to 30° with the inside wall of the socket, while the holding slope forms an angle of more than or equal to 60° with the inside wall of the socket. The elastic packing ring, which essentially is V-shaped, and the annular groove in the inside wall of the socket are coordinated with each other in such a way that when the packing ring has been inserted into the annular groove as specified, then the foot or lower segment of the packing ring rests against or is located only a slight distance removed from the holding slope of the annular groove, inside of the annular groove, below the inside wall surface of the socket. When the spigot end is being inserted, its front end encounters the front face of the leg of the ring projecting radially inward into the interior of the socket and, during the course of the continued insertion process, deflects this leg into the direction of insertion. This causes the outside edge of the foot or lower segment of the packing ring to slide downward on the holding slope of the annular groove to the bottom of the annular groove. At the same time, the leg of the packing ring pointing toward the socket outlet is lifted from the insertion slope and tilted radially inward until its radially extending inner surface fits against the outer wall of the spigot end.

What is functionally not quite satisfactory in the case of this known pipe spigot-and-socket connection is the shape of the profile of the annular groove and the manner in which the foot segment of the packing ring slides down the holding slope to the bottom of the annular groove when the spigot end is being inserted into the socket. Especially in the case of a narrow sealing clearance between the inside wall of the socket and the outside wall of the spigot end, it is possible for the packing ring to be lifted out or pulled out over the edge formed between the holding slope and the inside wall of the socket. Due to this, at least the contact pressure of the foot segment of the packing ring on the bottom of the annular groove is diminished. In extreme cases, it is even possible that the foot segment is lifted from the bottom of the annular groove. This phenomenon leads to a decrease in the reliability of the seal between the packing ring and the inside wall of the socket; more specifically, this leads to a decrease in the reliability of the seal between the foot segment of the packing ring and the bottom of the annular groove in the socket wall.

SUMMARY OF THE INVENTION

The present invention is an improvement in a ring-packed pipe spigot-and-socket connection of the known type such that even in the case of the narrowest sealing clearance, within the tolerance range, between the outside wall of the spigot end and the inside wall of the socket, while maintaining a reliable axial fixation of the V-shaped packing ring while the spigot end is being inserted into the socket, and without an increase in the required insertion forces, the segment of the packing ring facing the two sealing legs, i.e. the foot segment of the packing ring, is pressed against the bottom of the annular groove to effect a reliable seal.

The improved connection results from no longer fixing the foot segment of the V-shaped packing ring in position at the wall of the socket which is the rearward wall in the direction of insertion of the spigot into the socket, but instead to fix it in position axially at a radially deep-lying recess provided in the center of the socket. In so doing, the foot segment of the packing ring and the recess in the bottom of the annular groove are designed toroidally in complementary manner. The foot segment of the packing ring is located in the manner of a ring-shaped ball of a ball-and-socket joint in the recess which acts as a ring-shaped socket of said joint. On insertion of the spigot end into the socket, the front end of the spigot engages that leg of the V-shaped packing ring which extends radially into the interior of the socket, and veers this leg around toward the base of the socket, causing the packing ring to flex or tilt through its principal plane with guidance, support and tilting in this annular joint. Even if the recess acting as the socket of a joint is slightly undercut, the foot segment of the packing ring cannot be lifted because the joint is provided in a low or deep position.

The radius of curvature or bending radius of the foot segment of the V-shaped packing ring and of the recess in the bottom of the annular groove in the internal wall of the socket has been selected relatively large in order to obtain a joint surface which is as large as possible. Preferably, the diameter of the radius of curvature of the profile of the foot segment of the packing ring corresponds at least approximately to the thickness of the profile of the packing ring or of the cord profile from the tip or apex of the angle enclosed by the two legs of the V-shaped packing ring to the surface of the radially outward opposite-lying foot segment of the packing ring, as measured in the direction of the angle bisector between the two legs of the V-shaped packing ring.

The two legs of the V-shaped packing ring preferably are tapered in the outward direction in such a manner that the radially extending inner surface which comprises an axially extending, preferably cylindrical surface of the leg pointing to the outlet of the socket and the radially extending circular ring surface of the leg of the packing ring, which extends into the interior of the socket, are mutually perpendicular. The outer ends of these legs are preferably blunt or truncated in a relatively wide annular front surface.

In such an embodiment of the V-shaped packing ring for the pipe spigot-and-socket connection of the invention, the annular groove provided in the internal wall of the socket preferably is inclined toward the axis of the socket in such a manner that when the radial external surface of the packing ring leg pointing toward the outlet of the socket and substantially located horizontally lies against it, the internal surface of the packing ring leg lies substantially concentrically with respect to the inner wall surface of the socket when the inserted packing ring is in its slack or relaxed state prior to the insertion of the spigot end into the socket. The foot segment of the packing ring then lies in a flexibly compact and tiltable manner in the recess on the bottom of the socket. The rearward slanted surface or inclined plane of the annular groove, designed substantially in a flat or shallow V-shape, lies completely free or exposed prior to the insertion of the spigot end into the socket.

The two slanted surfaces or inclined planes of the annular groove designed in flat or shallow V-shape in the internal wall of the socket preferably are bound by two substantially radially extending circular ring surfaces. These circular ring surfaces preferably have a radial width which is at least equal to and preferably only slightly larger than the radial width of the adjoining segments of the legs of the V-shaped packing ring. In other words, the annular groove provided in the wall of the socket is of such a depth that it can accommodate the slack or relaxed V-shaped packing ring in such a way that the horizontally-lying leg pointing toward the outlet of the socket or the leg of the V-shaped packing ring lies within or flush with the annular groove relative to the internal wall surface of the socket. When the spigot end has been inserted into the socket and the packing ring has been tilted and spread out, the packing ring can be accommodated completely in the chamber without any noteworthy extrusion of material. Since at peak loading the outer jacket or surface of the spigot end rests on the internal wall of the socket in load-bearing fashion, without the shearing load proper having to be absorbed and borne by the packing ring, the ring-packed pipe spigot-and-socket connection of the invention is capable of sealing in a completely efficient manner even at peak shearing loads, without having to take into account disproportionately large amounts of material for the manufacture of the packing ring or unacceptably large insertion forces for the spigot end at small joint clearances.

The invention is described hereinafter with respect to one embodiment of the invention in conjunction with the accompanying drawing.

BRIEF DESCRIPTION OF THE DRAWING

The single FIGURE accompanying and forming a part of the present application, namely

Figure 1:
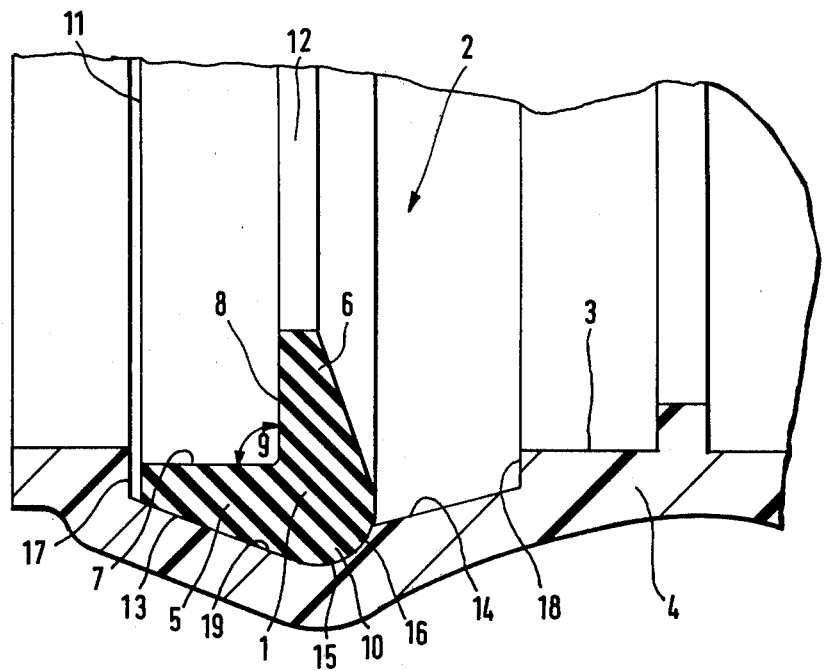
FIG. 1, is a representation of one embodiment of the ring-packed pipe spigot-and-socket connection in axial section in accordance with the invention.

DESCRIPTION OF A PREFERRED
EMBODIMENT OF THE INVENTION

The ring-packed pipe spigot-and-socket connection shown in FIG. 1 comprises a V-shaped packing ring 1, located in a substantially flat or shallow V-shaped annular groove 2 provided in the inside wall of a socket 4.

The socket 4, as well as the spigot end, preferably consists of plastic. Mineral materials such as, for instance, fired clay, asbestos-cement or concrete, or metal, can likewise be used as the material for the pipe ends to be connected to each other, namely the spigot end (not shown in FIG. 1), and the socket 4.

Packing ring 1 is formed of an elastic material, such as rubber. In axial section, packing ring 1 exhibits a substantially V-shaped cord profile. In the relaxed or slack state shown in FIG. 1 and in which the packing ring has been inserted into annular groove 2 in the inside wall 3 of socket 4, prior to the insertion of the spigot end into the socket in order to form the pipe spigot-and-socket connection, one ring lip or axial leg 5 of the V-shaped packing ring is located essentially axially with respect to the axis of socket 4, while the other ring lip or radial leg 6 extends into the interior of the socket in a substantially radial manner. The inside diameter of the packing ring, which is defined by radial leg 6, in every case is clearly smaller than the smallest possible external diameter, within the tolerance range, of the spigot end to be inserted into the socket 4 in order to create the pipe spigot-and-socket connection. The axial leg 5 and the radial leg 6 enclose a substantially right angle 9 between the radially inwardly extending cylindrical surface 7 and the essentially radially extending circular ring surface 8 of radial leg 6 which points generally toward the outlet of the socket. In the radially outward direction opposite the enclosed angle 9, a foot segment 10 is provided on packing ring 1. The foot segment 10 has a relatively large radius of curvature, is toroidally strong or rigid, and flatly or shallowly rounded off. The diameter of curvature of the rounded section of packing ring 1 in foot segment 10 corresponds at least approximately to the distance between the radially outwardly extending boundary surface of foot segment 10 and the point or apex of angle 9 enclosed by the two legs 5, 6, in the direction of the bisector of enclosed angle 9. This diameter of curvature preferably is only slightly larger than the deepest depth of annular groove 2. Due to this, at extremely great vertex shearing loads, the contact of the external wall of the spigot end against the inside wall 3 of socket 4 is cushioned, without the insertion forces required to insert the spigot end being noticeably increased by such cushioning.

Each of the two legs 5, 6 of the packing ring, which are tapered in the outward direction, includes a blunt or truncated end having a relatively wide annular surface. The annular surface 11 of axial leg 5 is a radially extending, substantially planar circular ring surface, while annular surface 12 of radial leg 6 is an axially aligned cylindrical ring surface.

Annular groove 2 provided in the substantially cylindrical inside wall 3 of socket 4 has a substantially flat or shallow V-shape, with a slanted surface 13 pointing toward the outlet of the socket and a slanted surface 14 pointing toward the base of the socket. In the zone of the radially deepest point of annular groove 2, that is, in the zone of the largest diameter of annular groove 2, between the two slanted surfaces 13, 14, a recess 15 is provided whose profile is complementary to the rounded profile in foot segment 10 of packing ring 1. The rearward wall of the recess 15, which is located closer to the base of the socket, preferably is designed slightly higher than the wall pointing toward the outlet of the socket. In an extreme case, this rearward wall 16 of recess 15 can even be slightly undercut. The foot segment 10 of the V-shaped packing ring 1, which is designed in rounded-off fashion with a relatively large diameter of curvature, lies like a ring-shaped ball of a ball-and-socket joint in the recess 15 which acts in the manner of a ring-shaped socket of a ball-and-socket joint.

The slanted surfaces 13, 14 of annular groove 2 are axially dimensioned to such a length that they can also comfortably accommodate the spread-out legs of packing ring 1. On its side pointing toward the outlet of the socket and on its side pointing toward the base of the socket, the annular groove 2 is bound by radially extending circular ring surfaces 17, 18, respectively. The radially inwardly extending boundary edge of these ring surfaces 17, 18 is defined by the inside wall 3 of socket 4. Radially, these circular ring surfaces 17, 18 are dimensioned of such a width that they are only slightly wider than the adjoining annular surface 11 or surface 12 (when the spigot end has been inserted and radial leg 6 has been tilted), respectively. This ensures that prior to insertion of the spigot end, the axial leg 5 of packing ring 1 with its radially inwardly extending cylindrical surface 7 is completely disposed in annular groove 2. In other words, the inside diameter of cylindrical surface 7 is greater than the inside diameter of wall 3 of socket 4. This facilitates the insertion of the spigot end into the socket, even when the sealing clearance between the outer jacket or surface of the spigot end and the internal wall of the socket is extremely small. Furthermore, this dimensioning provides that even in the case of an extremely high vertex shearing load, this load is not borne by the packing ring 1, but essentially by the inside wall 3 of socket 4.

Even extremely high vertex shearing loads thus do not change the deformation strain or stress of packing ring 1, which is essential for leak-tightness or sealing of the ring-packed pipe spigot-and-socket connection. The ring-packed pipe spigot-and-socket connection of the invention, therefore, is independent of vertex loads and shearing loads to an extremely high degree.

The slanted surface 13 pointing toward the outlet of the socket preferably is inclined with respect to the axis of the socket in such a way that when radial outer surface 19 of axial leg 5 lies against it in a flat manner, the surface 7 of axial leg 5 is aligned substantially axially and the ring-shaped joint ball of foot segment 10 of the packing ring 1 lies substantially flat against and compactly in recess 15 of annular groove 2.

On insertion of the spigot end into the socket 4 having packing ring 1, first the front end of the spigot end hits against the ring surface 8 of radial leg 6, which points toward the outlet of the socket. On continued insertion of the spigot end into the socket, radial leg 6 is deformed and bent away toward the base of the socket. This leads to a tilting of the packing ring 1 in the ring joint formed by foot segment 10 in recess 15. The tilting movement, therefore, is a rotation of the packing ring 1 through its principal plane about a circular line of tilt or line of traverse which lies in the center point of the circle of curvature of the foot segment profile and which is not displaced axially in socket 4 when the spigot end is inserted into socket 4.

When the spigot end has been inserted in the specified manner, the two legs 5, 6 of packing ring 1 provide the sealing action essentially symmetrically spread out at the outer cylindrical surface of the spigot end, while the foot segment 10 of packing ring 1 is pressed in a sealing manner onto the bottom of groove 2, that is, radially onto the bottom of recess 15. It is thus impossible for the foot segment 10 to be lifted out of annular groove 2.

Having described a presently preferred embodiment of the invention, it is to be understood that the invention may be otherwise embodied within the scope of the appended claims.

We claim:

1. In a ring-packed pipe spigot-and-socket connection in which an elastic packing ring, having a pair of legs defining an essentially V-shaped cross section and including a foot segment lying opposite the angle defined by the two legs, is located in an annular groove provided in the inside wall of a socket in such a way that (a) prior to the insertion of the spigot end, one of the two legs of the V-shaped packing ring has a radially internal surface substantially axially aligned and turned toward the outlet of the socket and the other leg extends substantially radially into the interior of the socket, and (b) after the spigot end has been pushed through the packing ring, the packing ring with its two legs lies against the external wall of the spigot end essentially symmetrically and in sealing fashion, and the foot segment of the packing ring, in the radially outward direction, lies on the bottom of the annular groove in sealing manner, the improvement comprising:

A. the annular groove having the shape of a substantially shallow V-shaped chamber having two slanted surfaces which can substantially accommodate the packing ring when the spigot end has been pushed through the packing ring, the slanted surfaces being axially only slightly longer than the legs of the packing ring associated with them, respectively, and on the axial ends of said surfaces a pair of radially circular ring surfaces whose radially inwardly extending edge is defined by the cylindrical inside wall of the socket;

B. the foot segment of the packing ring being formed toroidally and relatively shallowly rounded off; and C. in the zone of its greatest radius, the V-shaped annular groove includes a recess whose profile has been formed in a complementary manner to the profile of the foot segment of the packing ring such that upon insertion of the spigot into the socket the packing ring rotates relative to the socket and the foot segment of the packing ring is blocked against axial displacement and accommodated in a flexible manner to provide a seal therebetween.

2. The improvement defined in claim 1 wherein the diameter of curvature of the profile of the foot segment of the packing ring is substantially approximately equal to the thickness of the profile of the packing ring in the direction of a bisector of the angle between the two legs of the V-shaped packing ring.

3. The improvement defined in claim 1 or claim 2 wherein the slope of the slanted surface of the annular groove pointing toward the outlet of the socket is inclined toward the axis of the socket in such a way that when a radially external surface of the packing ring lies against said slanted surface of the annular groove, then the internal surface of the leg of the packing ring pointing toward the outlet of the socket is located substantially concentrically with respect to the cylindrical inside wall of the socket.

4. The improvement defined in claim 3 wherein a recess is provided in the annular groove and is formed higher on the side pointing toward the base of the socket than on the side pointing toward the inlet of the socket.

5. The improvement defined in claim 4 wherein the recess is designed in a slightly undercut manner.

6. The improvement defined in claim 5 wherein the angle enclosed by the two legs of the V-shaped packing ring is substantially a 90° angle.

7. The improvement defined in claim 6 wherein the two legs of the packing ring taper in the outward direction toward their ends and end bluntly in a truncated fashion in a relatively wide annular surface.

8. The improvement defined in claim 4 wherein the angle enclosed by the two legs of the V-shaped packing ring is substantially a 90° angle.

9. The improvement defined in claim 8 wherein the two legs of the packing ring taper in the outward direction toward their ends and end bluntly in a truncated fashion in a relatively wide annular surface.

10. The improvement defined in claim 3 wherein the angle enclosed by the two legs of the V-shaped packing ring is substantially a 90° angle.

11. The improvement defined in claim 10 wherein the two legs of the packing ring taper in the outward direction toward their ends and end bluntly in a truncated fashion in a relatively wide annular surface.

12. The improvement defined in claim 3 wherein in the relaxed state of the packing ring, the internal diameter of the internal surface of the leg of the packing ring which points toward the outlet of the socket is greater than the internal diameter of the socket, while the radially external surface of the packing ring rests on the bottom of the annular groove with, at the most, a slight radial initial stress.

13. The improvement defined in claim 12 wherein a recess is provided in the annular groove and is formed higher on the side pointing toward the base of the socket than on the side pointing toward the inlet of the socket.

14. The improvement defined in claim 13 wherein the recess is designed in a slightly undercut manner.

15. The improvement defined in claim 14 wherein the angle enclosed by the two legs of the V-shaped packing ring is substantially a 90° angle.

16. The improvement defined in claim 15 wherein the two legs of the packing ring taper in the outward direction toward their ends and end bluntly in a truncated fashion in a relatively wide annular surface.

17. The improvement defined in claim 13 wherein the angle enclosed by the two legs of the V-shaped packing ring is substantially a 90° angle.

18. The improvement defined in claim 17 wherein the two legs of the packing ring taper in the outward direction toward their ends and end bluntly in a truncated fashion in a relatively wide annular surface.

19. The improvement defined in claim 12 wherein the angle enclosed by the two legs of the V-shaped packing ring is substantially a 90° angle.

20. The improvement defined in claim 19 wherein the two legs of the packing ring taper in the outward direction toward their ends and end bluntly in a truncated fashion in a relatively wide annular surface.

21. The improvement defined in claim 1 or claim 2 wherein a recess is provided in the annular groove and is formed higher on the side pointing toward the base of the socket than on the side pointing toward the inlet of the socket.

22. The improvement defined in claim 21 wherein the recess is designed in a slightly undercut manner.

23. The improvement defined in claim 21 wherein the angle enclosed by the two legs of the V-shaped packing ring is substantially a 90° angle.

24. The improvement defined in claim 23 wherein the two legs of the packing ring taper in the outward direction toward their ends and end bluntly in a truncated fashion in a relatively wide annular surface.

25. The improvement defined in claim 22 wherein the angle enclosed by the two legs of the V-shaped packing ring is substantially a 90° angle.

26. The improvement defined in claim 25 wherein the two legs of the packing ring taper in the outward direction toward their ends and end bluntly in a truncated fashion in a relatively wide annular surface.

27. The improvement defined in claim 1 or claim 2 wherein the angle enclosed by the two legs of the V-shaped packing ring is substantially a 90° angle.

28. The improvement defined in claim 27 wherein the two legs of the packing ring taper in the outward direction toward their ends and end bluntly in a truncated fashion in a relatively wide annular surface.

* * * * *